United States Patent
Lu et al.

(10) Patent No.: US 10,606,650 B2
(45) Date of Patent: Mar. 31, 2020

(54) METHODS AND NODES FOR SCHEDULING DATA PROCESSING

(71) Applicant: Telefonaktiebolaget LM Ericsson (publ), Stockholm (SE)

(72) Inventors: Yue Lu, Sollentuna (SE); Fetahi Wuhib, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 108 days.

(21) Appl. No.: 15/555,843

(22) PCT Filed: Mar. 24, 2015

(86) PCT No.: PCT/SE2015/050355
§ 371 (c)(1),
(2) Date: Sep. 5, 2017

(87) PCT Pub. No.: WO2016/153401
PCT Pub. Date: Sep. 29, 2016

(65) Prior Publication Data
US 2018/0039520 A1     Feb. 8, 2018

(51) Int. Cl.
*G06F 9/50*     (2006.01)

(52) U.S. Cl.
CPC ............ *G06F 9/5027* (2013.01); *G06F 9/505* (2013.01)

(58) Field of Classification Search
CPC .................... G06F 9/5027; G06F 9/505
See application file for complete search history.

(56) References Cited

U.S. PATENT DOCUMENTS 5,475,608 A * 12/1995 Masuoka ............ G06F 17/5072
716/124
7,752,622 B1   7/2010 Markov
(Continued)

FOREIGN PATENT DOCUMENTS

EP     2256632 A1     12/2010

OTHER PUBLICATIONS

Boutin, Eric et al., "Apollo: Scalable and Coordinated Scheduling for Cloud-Scale Computing", Proceedings of the 11th USENIX Symposium on Operating Systems Design and Implementation (OSDI '14), Oct. 6-8, 2014, 284-300.
(Continued)

*Primary Examiner* — Wissam Rashid
*Assistant Examiner* — Jorge A Chu Joy-Davila
(74) *Attorney, Agent, or Firm* — Murphy, Bilak & Homiller, PLLC

(57) ABSTRACT

A method and job scheduling node (200) for scheduling data processing across a set of processing machines (202), each processing machine comprising at least one data processor. When receiving (2:2) a request for a data processing job, the job scheduling node (200) obtains (2:5) a current processor resource status of each processing machine, the processor resource status indicating at least current usage of each data processor in said processing machine. The job scheduling node (200) further selects (2:6) at least one vacant data processor in the set of processing machines based on the obtained processor resource status, for executing the data processing job, and dispatches (2:7) the data processing job to at least one processing machine (202*a*) where the at least one selected data processor is located.

4 Claims, 5 Drawing Sheets

(56) References Cited

U.S. PATENT DOCUMENTS

| | | | | |
|---|---|---|---|---|
| 8,418,181 | B1* | 4/2013 | Sirota | H04L 67/00 |
| | | | | 709/201 |
| 9,256,467 | B1* | 2/2016 | Singh | G06F 9/5055 |
| 9,513,967 | B2* | 12/2016 | Dube | G06F 9/5011 |
| 2003/0074387 | A1* | 4/2003 | Tanaka | G06F 9/5038 |
| | | | | 718/103 |
| 2003/0149716 | A1 | 8/2003 | Peterson | |
| 2005/0071843 | A1 | 3/2005 | Guo et al. | |
| 2009/0094611 | A1* | 4/2009 | Danne | G06F 9/5033 |
| | | | | 718/105 |
| 2010/0146516 | A1* | 6/2010 | Yao | G06F 9/505 |
| | | | | 718/105 |
| 2014/0237477 | A1 | 8/2014 | Cadambi et al. | |

OTHER PUBLICATIONS

Schwarzkopf, Malte, "Omega: flexible, scalable schedulers for large compute clusters", SIGOPS European Conference on Computer Systems (EuroSys), ACM, Prague, Czech Republic, 2013, 351-364.
Sharma, Bikash et al., "HybridMR: A Hierarchical MapReduce Scheduler for Hybrid Data Centers", 2013 IEEE 33rd International Conference on Distributed Computing Systems, Jul. 8-11, 2013, 102-111.

* cited by examiner

| Processor | Processor queue | I/O time | Owner ID |
|---|---|---|---|
| P1 | Vacant | 1s | Ericsson |
| P2 | Occupied | 2s | Ericsson |
| P3 | Occupied | 8s | Xx other |
| ... | ... | ... | ... |
Resource status for PM1
Fig. 3
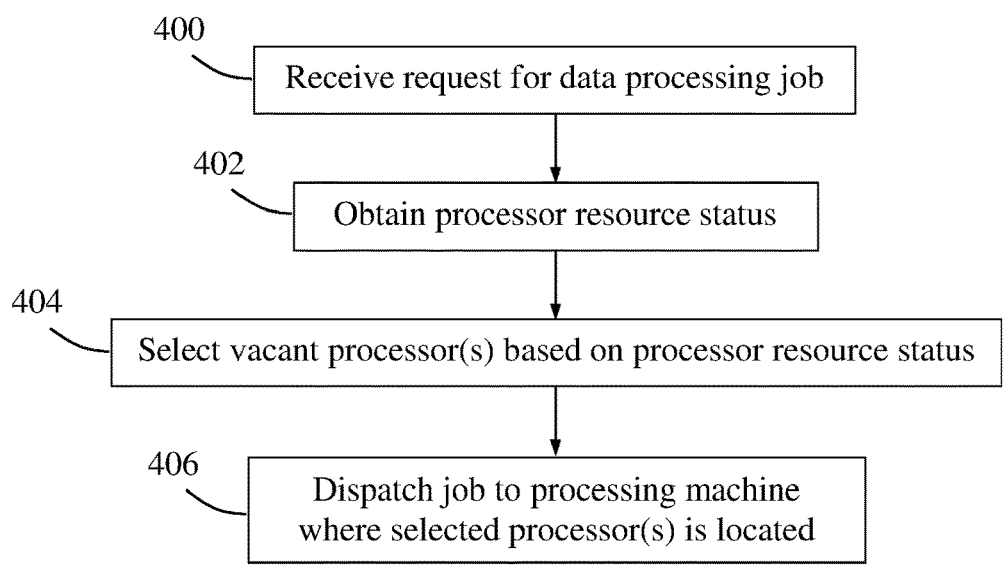
Fig. 4
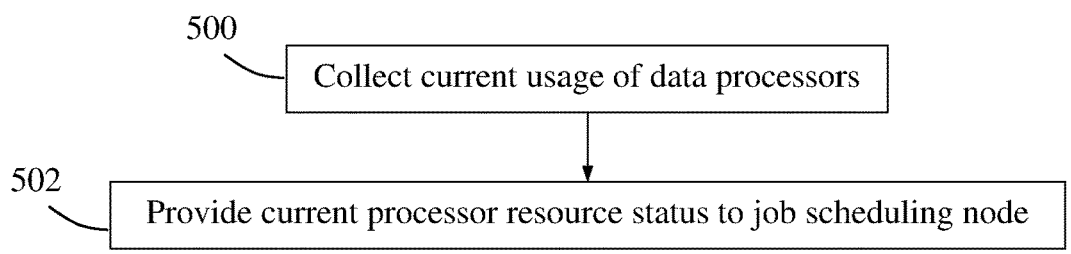
Fig. 5

METHODS AND NODES FOR SCHEDULING DATA PROCESSING

TECHNICAL FIELD

The present disclosure relates generally to a job scheduling node, a resource monitor and methods therein, for scheduling data processing across a range of processing machines each processing machine comprising one or more data processors.

BACKGROUND

In the field of data processing, clients such as different companies, enterprises, organizations and authorities have a need for hardware and software resources in order to perform various data processing operations. In this disclosure, the term "data processor" is used for short to represent any equipment that can be used for computer executed operations involving data handling e.g. relating to analysis, calculation, compilation, conversion and data storage.

Traditionally, the clients themselves may own and maintain all the resources they need for data processing which can be quite costly and time-consuming, though. For example, considerable knowledge and skills are required to first find out what type of resources is needed, and to acquire and install those resources. The client thus often needs to employ skilled staff and/or hire consultants to enable efficient use of resources. Furthermore, as the technique is developing and progressing rapidly in the field of computers and software, purchased or hired resources tend to become out-of-date very quickly and must frequently be replaced by new resources with better performance, which is naturally costly and time-consuming. Another problem is that a client may need a great amount of resources for a very limited period to make some large operation once or just a few times a year, e.g. related to economics, statistics or stock inventory, while very little resources are used during the remainder periods. The client thus has to make investments in resources enough to cope with such peak usage and also when demands and operation change over time.

In recent years, it has become possible for clients to hire and utilize shared resources for data processing, e.g. residing in large data centers comprising a great range of processors, computers and data storages. Effectively, all the needed resources may be available from such a data center and the clients do not have to make their own investments in costly resources. Resources are thus allocated to clients for executing requested processing operations, and new resources can be allocated again to the client whenever needed.

Some load balancing functionality is typically employed for distributing incoming processing requests evenly over different processing machines so as to avoid bottlenecks and increase resource utilization in a data center or the like. In this disclosure, the term "processing machine" is used to represent a node or server in a data center or the like which node or server comprises one or more data processors that can be used for data processing for incoming processing requests. A set of processing machines is commonly referred to as a "cluster" for short. Further, a requested processing operation is referred to as a "data processing job", or just "job" for short, which can have different durations and requirements depending on the processing request.

In this field there are basically two types of data processing machines: 1) Physical Machine, PM, which is a stationary processing equipment with fixed capacity, and 2) Virtual Machine, VM, which is a temporary processing equipment with flexible capacity in that resources are created and configured on a dynamic basis specifically for each processing request. A VM basically exists only while the job is executed and the resources are released after completion of the job, while a PM exists more or less permanently regardless of whether any job is executed or not. A set of PMs is sometimes referred to as a "native cluster" and a set of VMs is referred to as a "virtual cluster". Further, a "hybrid cluster" denotes a combination of native and virtual clusters. VMs are typically used in a so-called cloud computing context. The VM is thus not part of the native cluster and it can be seen as an additional external resource to augment the native, or physical, cluster. The following description will chiefly be concerned with the usage of PMs.

A job scheduling function, or "job scheduler", is typically employed for selecting one or more suitable PMs for executing a requested data processing job which may be composed of multiple tasks that can be executed by the same PM or by different separate PMs. For example, each task of a data processing job may be executed by a separate PM. In other words, the job scheduler tries to find and select one or more PMs that should be capable of performing the job.

FIG. 1 illustrates a communication scenario where a system 100 of different shared resources are utilized for handling and executing processing requests, denoted "PRs", from different clients 102. In this example, resources are available from a native cluster 100b of PMs and from a virtual cluster 100b of VMs. The incoming processing requests PRs are distributed by a job scheduler 104 to suitable PMs and VMs. More than one job scheduler may also be used to serve the system 100 of PMs and VMs and some load balancing function, not shown, may be applied to distribute incoming processing requests over the job schedulers.

However, it is a problem that the selection of processing machines for a requested processing job may not be optimal or even successful in that a selected processing machine may not be able to execute the processing job to satisfaction due to various current circumstances. Therefore, the clients may experience bad performance and certain Service Level Agreements, SLAs, may be violated when an expected performance is not accomplished or fulfilled, particularly when service requirements are strict. Another problem is that some processing machines may be heavily loaded and congested while others may be under-utilized, even if some load balancing function is applied. For example, some processing machines may tend to receive processing jobs of long duration such that their resources are occupied to a great extent.

SUMMARY

It is an object of embodiments described herein to address at least some of the problems and issues outlined above. It is possible to achieve this object and others by using methods and nodes as defined in the attached independent claims.

According to one aspect, a method is performed by a job scheduling node for scheduling data processing across a set of processing machines, each processing machine comprising at least one data processor. In this method, the job scheduling node receives a request for a data processing job, and obtains a current processor resource status of each processing machine, the processor resource status indicating at least current usage of each data processor in said processing machine. The job scheduling node then selects at least one vacant data processor in the set of processing machines based on the obtained processor resource status, for executing the data processing job, and dispatches the data processing job to at least one processing machine where the at least one selected data processor is located.

According to another aspect, a job scheduling node is arranged to schedule data processing across a range of processing machines. The job scheduling node comprises a processor and a memory, said memory comprising instructions executable by said processor whereby the job scheduling node is operative to:
  receive a request for a data processing job,
  obtain a current processor resource status of each processing machine, the processor resource status indicating at least current usage of each data processor in said processing machine,
  select at least one vacant data processor in the set of processing machines based on the obtained processor resource status, for executing the data processing job, and
  dispatch the data processing job to at least one processing machine where the at least one selected data processor is located.

According to another aspect, a method is performed by a resource monitor for assisting a job scheduling node to schedule data processing across a set of processing machines, each processing machine comprising at least one data processor. In this method, the resource monitor collects a current usage of the data processors in each processing machine, and provides a current processor resource status of each processing machine to the job scheduling node the processor resource status indicating said current usage of each data processor. Thereby, the job scheduling node is enabled to select at least one data processor in the set of processing machines for executing a data processing job, based on the current processor resource status.

According to another aspect, a resource monitor is arranged to assist a job scheduling node to schedule data processing across a set of processing machines, each processing machine comprising at least one data processor. The resource monitor comprises a processor and a memory, said memory comprising instructions executable by said processor whereby the resource monitor is operative to:
  collect a current usage of the data processors in each processing machine, and
  provide a current processor resource status of each processing machine to the job scheduling node, the processor resource status indicating said current usage of each data processor, thereby enabling the job scheduling node to select at least one data processor in the set of processing machines for executing a data processing job, based on the current processor resource status.

The above methods and nodes may be configured and implemented according to different optional embodiments to accomplish further features and benefits, to be described below.

A computer program is also provided comprising instructions which, when executed on at least one processor in either of the job scheduling node and the resource monitor, cause the at least one processor to carry out the method described above for the score management node. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which:

FIG. 3 is a table illustrating an example of a scheduling matrix, according to further possible embodiments.

FIG. 4 is a flow chart illustrating a procedure in a job scheduling node, according to further possible embodiments.

FIG. 5 is a flow chart illustrating a procedure in a resource monitor, according to further possible embodiments.

DETAILED DESCRIPTION

Figure 1:
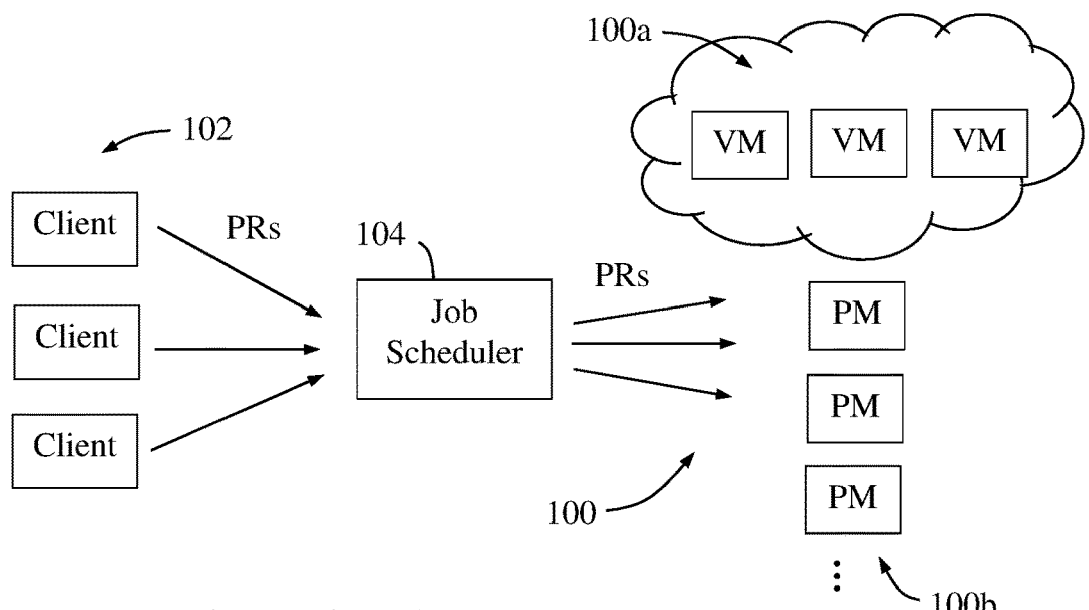
FIG. 1 is a communication scenario illustrating how processing requests are distributed to different processing machines, according to the prior art.

Briefly described, a solution is provided to ensure that selection of data processors in processing machines for executing data processing jobs is made in an optimal or at least amply efficient manner, based on at least the current usage of the data processors, so as to improve service performance and resource utilization. This solution involves a functional node denoted "job scheduling node" which is operable to schedule incoming requests for data processing jobs across different data processors residing in a set of processing machines, typically PMs, and to dispatch the jobs accordingly.

For example, a processing machine may hold a number of individual data processors which can be used when executing a data processing job which may be composed of one or more individual tasks. The solution is however not limited to any particular number of data processors in the processing machines, and in this disclosure a processing machine is defined as comprising at least one data processor. As mentioned above, a data center or system may comprise a substantial amount of processing resources in the form of processing machines and data processors therein. The tasks of a job may further be scheduled and dispatched to different data processors e.g. residing in different processing machines, and the solution is not limited in this respect.

The solution and its embodiments will be described in terms of functionality in one job scheduling node. However, multiple job scheduling nodes may be employed within the scope of this solution, e.g. distributed in a decentralized manner, to handle any amount of incoming job requests in the manner described herein. In more detail, the job scheduling node obtains the current status of each data processor, which will be referred to as "processor resource status" in the following. The processor resource status indicates at least the current usage of the data processors and may also optionally indicate "data locality" which refers to the time it takes for a data processor to retrieve data required for executing a task in the requested data processing job.

Another node denoted "resource monitor" may be used for collecting the current status of all data processors on a regular basis so that the processor resource status of each processing machine is kept up-to-date in the resource monitor. The job scheduling node may in that case obtain the processor resource status from the resource monitor whenever needed for scheduling an incoming data processing job.

An example of how the solution may be used will now be described with reference to FIG. 2 which illustrates a job scheduling node, JSN 200, a set of processing machines 202 denoted PM1, PM2, PM3 . . . , a resource monitor 204, and a database 206 for maintaining statistics of how long time it takes to complete different executed data processing jobs, referred to as "Job Completion Time", JTC. One of the processing machines 202a is shown in more detail to comprise a number of data processors, in this example six data processors P1-P6, although the procedure to be described is applicable to any number of data processors in the processing machines 202. It is assumed that the processing machines 202 are physical machines although the solution does not exclude that virtual machines are also used for certain jobs.

A first shown action 2:1 illustrates that a current processor usage in the processing machines 202 is reported to the resource monitor 204 on continuous basis, which may be made at regular time intervals or whenever the processor usage has changed significantly in a data processor. A local usage monitor, or "node monitor", or the like may be arranged in each processing machine 202 to handle the reporting of current processor usage. In this example, it is assumed that the resource monitor 204 maintains the current processor resource status of each processing machine 202, which indicates at least the reported current usage of each data processor in the processing machines. Alternatively, the job scheduling node 200 may maintain the processor resource status of the processing machines, thus omitting the resource monitor 204.

The current processor resource status may be maintained in a scheduling matrix denoted M1, M2, M3 . . . for each processing machine PM1, PM2, PM3 . . . , respectively, where the scheduling matrix contains information about the current usage of each data processor and optionally also about the above-mentioned data locality of the processor. An example of such a matrix is shown in FIG. 3, to be described later below. The scheduling matrix may be updated whenever a new resource status is reported as of action 2:1 which may thus be repeated at any time during this procedure.

The current usage of a data processor is determined by whether the processor has a queue of waiting jobs or tasks to be executed, denoted "Q" which are schematically illustrated next to each processor P1-P6. For example, if the queue at a processor is empty, such as Q1 at processor P1, the processor is considered to be vacant, see also processor P5. Otherwise, the processor is considered to be occupied, such as processor P4 having queue Q4 and also processors P2, P3 and P6 in this example.

Another action 2:2 illustrates that the job scheduling node 200 receives an incoming request for a data processing job from a client, not shown. In this solution, all incoming job requests may be categorized or classified depending on the magnitude or duration of the job. In more detail, a requested job may be identified to be either "short-lived", "medium-lived" or "long-lived", and the scheduling may be performed depending on the job duration. The solution described herein may be applied only for the short-lived jobs and some medium-lived jobs, while at least the long-lived jobs can be dispatched immediately to a virtual machine without performing the following actions in this procedure.

In general, a short-lived job has a duration less than a second, such as a retrieval of some limited piece of information from a database or the like, while a long-lived job may have a duration in the range of hours or even days, e.g. real-time gaming or regular streaming of media such as movies which may be controlled by SLA. A medium-lived job can in this context be defined as having a duration within a certain predefined interval, while the short-lived and long-lived jobs are below and above that interval, respectively.

A further action 2:3 thus illustrates that the job scheduling node 200 identifies the requested job as a medium-lived one with a duration that is expected to be within a predefined interval. Alternatively, the requested job may be identified as a short-lived one in this action. Furthermore, in a possible implementation, the job scheduling node 200 may estimate a job completion time JCT if the job is a medium-lived job, by checking the JCT database 206, in another action 2:4, where the duration of previously executed similar jobs are maintained.

A required or expected completion time may further be identified for the medium-lived job, e.g. according to prevailing service requirements or assumed client expectations. The job scheduling node 200 may then proceed to schedule the job according to the following actions if the JCT estimated for the job is substantially equal to or larger than the required or expected completion time of the medium-lived data processing job. If so, it can be assumed that the actual JCT achieved for this job is critical and there is a risk that the actual JCT might exceed the required or expected completion time, and the job can in this case be identified as a "risky" job. Therefore, it is deemed worthwhile to cater for as short JCT as possible for such a medium-lived job by scheduling the job according to the following actions. Otherwise if not time-critical, the job can be dispatched immediately to a virtual machine, like the short-lived and long-lived jobs.

Another action 2:5 illustrates that the job scheduling node 200 obtains the current processor resource status of each processing machine 202 from the resource monitor 204. The current processor resource status thus indicates at least the current usage of each data processor in the processing machines, as reported in action 2:1. In particular, the processor resource status indicates which data processors are vacant and which are occupied.

The job scheduling node 200 then selects, in a following action 2:6, at least one vacant data processor in the set of processing machines based on the obtained processor resource status, for executing the data processing job. In this action, if the job is composed of multiple individual tasks, the job scheduling node 200 may select a data processor for each task such that several data processors are selected to jointly execute the data processing job. In this example, the vacant processors P1 and P5 in processing machine 202a are selected.

It was mentioned above that the processor resource status may further indicate data locality referring to the time it takes to retrieve required data, which may also be referred to as the input/output time, or "I/O time" for short. If there are several vacant processors to choose from, the job scheduling node 200 may select the at least one vacant data processor with closest data locality, i.e. shortest I/O time, which will ensure that the job will be executed with shortest possible JCT. Further, the processor resource status may also indicate a user identification of each data processor, and the job scheduling node 200 may in that case select the at least one vacant data processor further based on said user identification. The user identification basically indicates the ownership of a processor. For example, some user identification(s) may take precedence over others to the client and their data processors may be selected first and foremost if possible.

In some implementations, the user identification may be given highest priority, i.e. being decisive, when selecting a processor for a job, while in other cases the vacancy or the I/O time may be the most critical aspect deciding which processor(s) to select. Thus, any priority order of vacancy, I/O time and user identification may be used when selecting the at least one data processor for executing the data processing job and the solution is not limited in this respect.

A final action 2:7 illustrates that the job scheduling node 200 dispatches the job, or its individual tasks if any, to at least one processing machine where the at least one selected data processor is located, in this example to the processing machine 202a. Before dispatching the job or tasks, the job scheduling node 200 may, as part of action 2:6, "probe" the selected data processor(s) to find out if they are ready to execute the job or task(s). In this disclosure, "probing" means that the job scheduling node 200 sends a reservation to the selected data processor(s) so as to avoid collisions with other data processing jobs for which the same processors may be selected. For example, the job scheduling node 200 may adjust the I/O time of each processor by adding a random factor and use the adjusted, i.e. increased, I/O time as a basis for selecting the at least one vacant data processor in action 2:6. A more detailed example of how this probing procedure may be employed will be described later below with reference to FIG. 6.

FIG. 3 illustrates how the above-mentioned scheduling matrix may be configured where the current processor resource status of a processing machine may be maintained. In this example, the scheduling matrix indicates that processor P1 is currently vacant and has a data locality or I/O time of 1 second, processor P2 is currently occupied and has a data locality or I/O time of 2 seconds, processor P3 is currently occupied and has a data locality or I/O time of 8 seconds, and so forth. The scheduling matrix in FIG. 3 may be M1 in FIG. 2 which indicates the current resource status for the processing machine PM1.

This scheduling matrix may thus be used, along with similar scheduling matrices M2, M3 . . . reflecting other processing machines PM2, PM3 . . . , as a basis for selecting one or more suitable data processors for a job and for individual tasks thereof, if any. In this example, processor P1 might be selected since it is indicated to be currently vacant. The scheduling matrix further comprises information about a user identification of each data processor, denoted "owner ID", including Ericsson for processors P1 and P1 and another user identification xx for processor P3. As described above, the user identification may be used as a further basis for selecting data processor(s).

An example of how the solution may be employed will now be described with reference to the flow chart in FIG. 4 which illustrates a procedure with actions performed by a job scheduling node, such as the job scheduling node 200 described above, for, to accomplish the functionality described above. The job scheduling node is operative to schedule data processing across a set of processing machines, each processing machine comprising at least one data processor.

A first action 400 illustrates that the job scheduling node receives a request for a data processing job, which corresponds to action 2:2 as described above. In a following action 402, the job scheduling node obtains a current processor resource status of each processing machine, the processor resource status indicating at least current usage of each data processor in said processing machine. As mentioned above, the current processor resource status may be maintained in a resource monitor such as the resource monitor 204 in FIG. 2, or in the job scheduling node itself. This action basically corresponds to action 2:5 as described above.

In a further action 404, the job scheduling node selects at least one vacant data processor in the set of processing machines based on the obtained processor resource status, for executing the data processing job, e.g. multiple individual tasks identified therein. This action basically corresponds to action 2:6 as described above. For example, if the data processing job contains only one single task, one single processor may be selected for that task.

A final shown action 406 illustrates that the job scheduling node dispatches the data processing job to at least one processing machine where the at least one selected data processor is located, which corresponds to action 2:7 as described above. For example one task in the job may be dispatched to processor P1 which is currently vacant in PM1, while another task in the job may be dispatched to processor P5 which is likewise currently vacant in PM1.

Various communication protocols may be used in the communication performed in the above-described actions 2:1, 2:4, 2:5, 2:7, 402 and 406 such as multicasting, query-based client-server protocol, Remote Procedure Call (RPC) probes, etc. The solution is however not limited to using any particular communication protocols which is subject to practical implementation.

Various optional embodiments may be used in the above-described procedure in the job scheduling node. In a possible embodiment, the processor resource status may further indicate data locality referring to the time it takes to retrieve required data, and the job scheduling node may in that case select the at least one vacant data processor with closest data locality, i.e. shortest I/O time. It was described above how the data locality can be used as a basis for selecting data processors to achieve shortest possible actual JCT for the job.

In another possible embodiment, the current processor resource status may be maintained in a scheduling matrix for each processing machine, the scheduling matrix containing information about the current usage and data locality of each data processor of said processing machine. In another possible embodiment, the processor resource status may further indicate a user identification of each data processor, and the job scheduling node may in that case select the at least one vacant data processor further based on said user identification. The scheduling matrix may further contain such a user identification, e.g. as shown in FIG. 3.

In yet another possible embodiment, the job scheduling node may identify a plurality of tasks in the data processing job, select a data processor for each task, and dispatch each task separately to the corresponding data processor. Some examples of how different tasks can be scheduled and dispatched to different data processors have been described above. Furthermore, the job scheduling node may in that case determine an order of execution of the identified tasks and dispatches the tasks in said order to the corresponding selected data processors, as of another possible embodiment.

In another possible embodiment, if the data processing job is identified as a medium-lived job with a duration within a predefined interval, the job scheduling node may estimate a job completion time for the data processing job, as described for action 2:4 above. The job scheduling node may then perform the method when the estimated job completion time is substantially equal to or larger than a required completion time of the data processing job, which implies that the job can be identified as being a risky job where the JCT actually achieved for the job is critical in some sense. This embodiment basically corresponds to action 2:3 in FIG. 2. A more detailed example of how this might be done will be described later below with reference to FIG. 7. In another possible embodiment, the job scheduling node may estimate the job completion time based on recorded statistics for job completion times of previously executed data processing jobs, e.g. as maintained by the JCT database 206 in FIG. 2. This embodiment basically corresponds to action 2:4 in FIG. 2.

Another example of how the solution may be employed when using a resource monitor such as the resource monitor 204 in FIG. 2, will now be described with reference to the flow chart in FIG. 5 which illustrates a procedure with actions performed by a resource monitor, to assist the functionality described above. The resource monitor is operative to assist a job scheduling node, such as the job scheduling node 200, to schedule data processing across a set of processing machines, each processing machine comprising at least one data processor.

Figure 2:
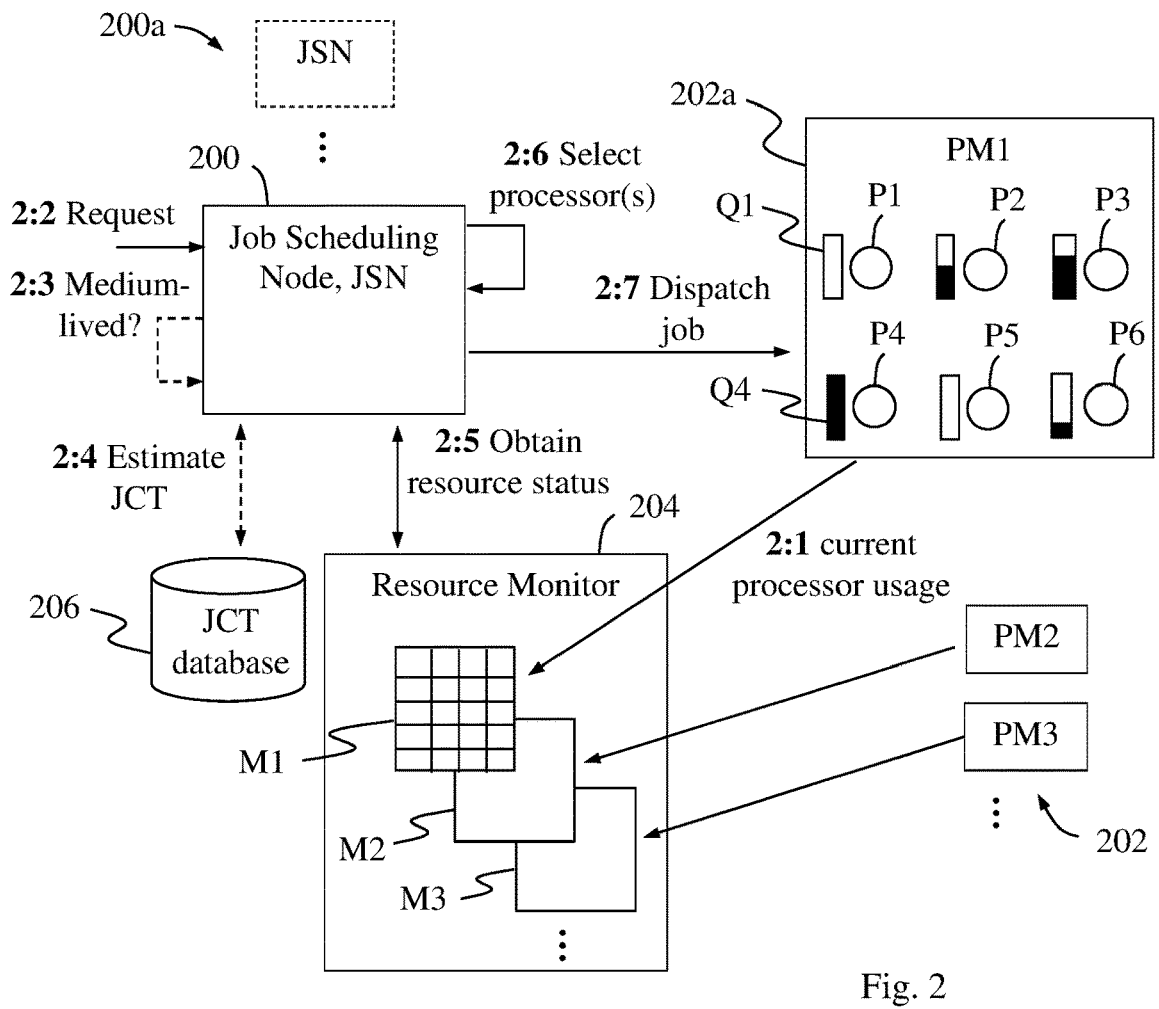
FIG. 2 is a communication scenario illustrating an example of how the solution may be employed, according to some possible embodiments.

A first action 500 illustrates that the resource monitor collects a current usage of the data processors in each processing machine, which basically corresponds to action 2:1 in FIG. 2. In another action 502, the resource monitor provides a current processor resource status of each processing machine to the job scheduling node, which basically corresponds to action 2:5 in FIG. 2. The processor resource status indicates said current usage of each data processor. Thereby, the job scheduling node is enabled to select at least one data processor in the set of processing machines for executing a data processing job, based on the current processor resource status, basically as described above for action 2:6.

Figure 6:
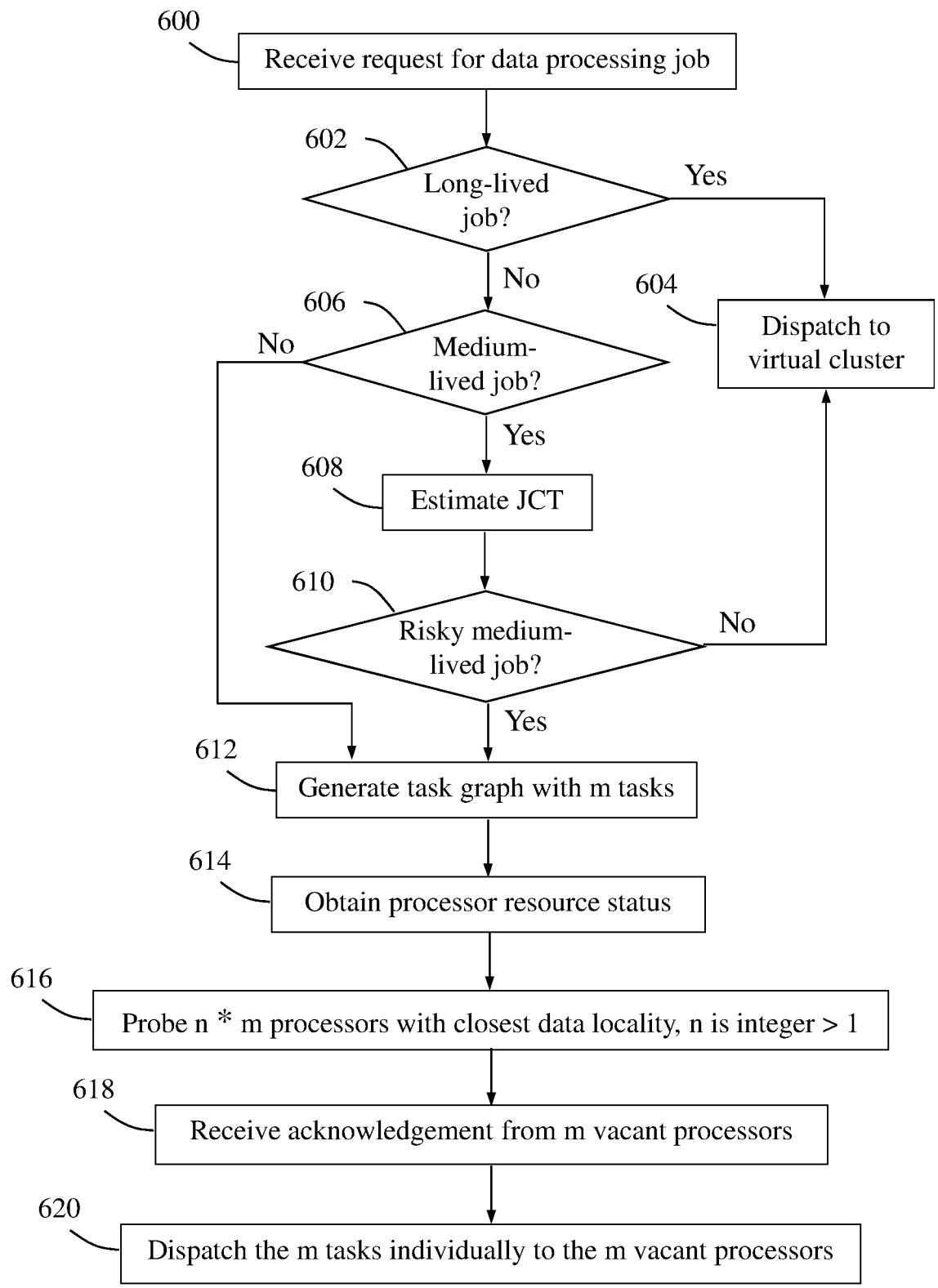
FIG. 6 is a flow chart illustrating an example of a more detailed procedure in a job scheduling node, according to further possible embodiments.

A more detailed example of how the actions 2:2-2:7 of FIG. 2 may be implemented in practice, will now be described with reference to the flow chart in FIG. 6 comprising actions which may be performed by a job scheduling node. The first action 600 illustrates that the job scheduling node receives a request for a data processing job, which corresponds to actions 2:2 and 400 as described above. In a next action 602, the job scheduling node determines or estimates whether the job can be classified as a long-lived job. If so, the job scheduling node dispatches the requested data processing job to a virtual machine in a virtual cluster, in an action 604.

If the job cannot be classified as a long-lived job in action 602, the job scheduling node proceeds to determine or estimate whether the job can be classified as a medium-lived job, in a further action 606. If so, the job scheduling node estimates the JCT of the job in an action 608, basically in the manner described above for action 2:4. The job scheduling node then further determines or estimates whether the job can be identified as being a risky medium-lived job, in a further action 610, e.g. when the estimated JCT is substantially equal to or larger than a required completion time of the data processing job, which implies that the job can be identified as being a risky job. If it is not identified as a risky job, the job scheduling node can dispatch the requested data processing job to a virtual machine in a virtual cluster, by proceeding to action 604. If the job could not be classified as medium-lived in action 606, actions 608 and 610 can be omitted.

Thus, if the job is a short lived job and cannot be classified as a medium-lived job in action 606, or if the job can be identified as being a risky medium-lived job in action 610, the job scheduling node proceeds to generate a task graph for the job in an action 612. It was mentioned above that a plurality of tasks may be identified in the data processing job, and that the job scheduling node may select a data processor for each task in the job. The job scheduling node may further determine in which order the tasks should be executed, which is determined by the task graph.

In a next action 614, the job scheduling node obtains the current processor resource status of each processing machine, basically as described above for actions 2:2 and 400, respectively. Next, the job scheduling node enters a probing phase in this procedure. It was mentioned above that probing means that the job scheduling node sends a reservation to data processors so as to avoid collisions with other data processing jobs. This probing procedure can be performed as follows.

A further action 616 illustrates that the job scheduling node probes n*m processors with closest data locality, where n is an integer>1. This may be performed in more detail according to the following steps a-d.

a. Select (n+h)*m processors, in which n is an integer as the probing ratio, h is a positive decimal (preferably smaller than 1), and m denotes the number of tasks identified in the job. It may be required that the selected processors are "non-constrained" in the sense that their user identification does not restrict selection for the job scheduling node.

b. Adjust the I/O time of each selected processor by adding a random factor "IO_random" to the I/O time of each processor, which may be proportional to a certain communication overhead required between the job scheduling node and the selected data processor, here denoted "Latency_communication", i.e.

IO_random=i*Latency_communication, in which i is a certain percentage between 0% and 100%, and the new adjusted IO_time, denoted IO_time', is IO_time'=IO_time+IO_random.

c. Sort out a list of (n+h)*m processors based on the new I/O times, IO_time', in an ascending order.

d. Send probes to the first n*m processors. For example, the probes may be sent in this step using the protocol called Remote Procedure Call, RPC.

Another action 618 illustrates that the job scheduling node receives an acknowledgement from at least m vacant data processors, thus indicating that the corresponding tasks have been reserved for execution by the respective processors. Thereby, m vacant data processors have been selected which are ready to execute the tasks of the job without the risk of collision e.g. caused by a scheduling conflict with another job scheduling node. A final action 620 illustrates that the job scheduling node dispatches the m tasks to the respective m vacant data processors, basically as described above for actions 2:7 and 406, respectively.

Figure 7:
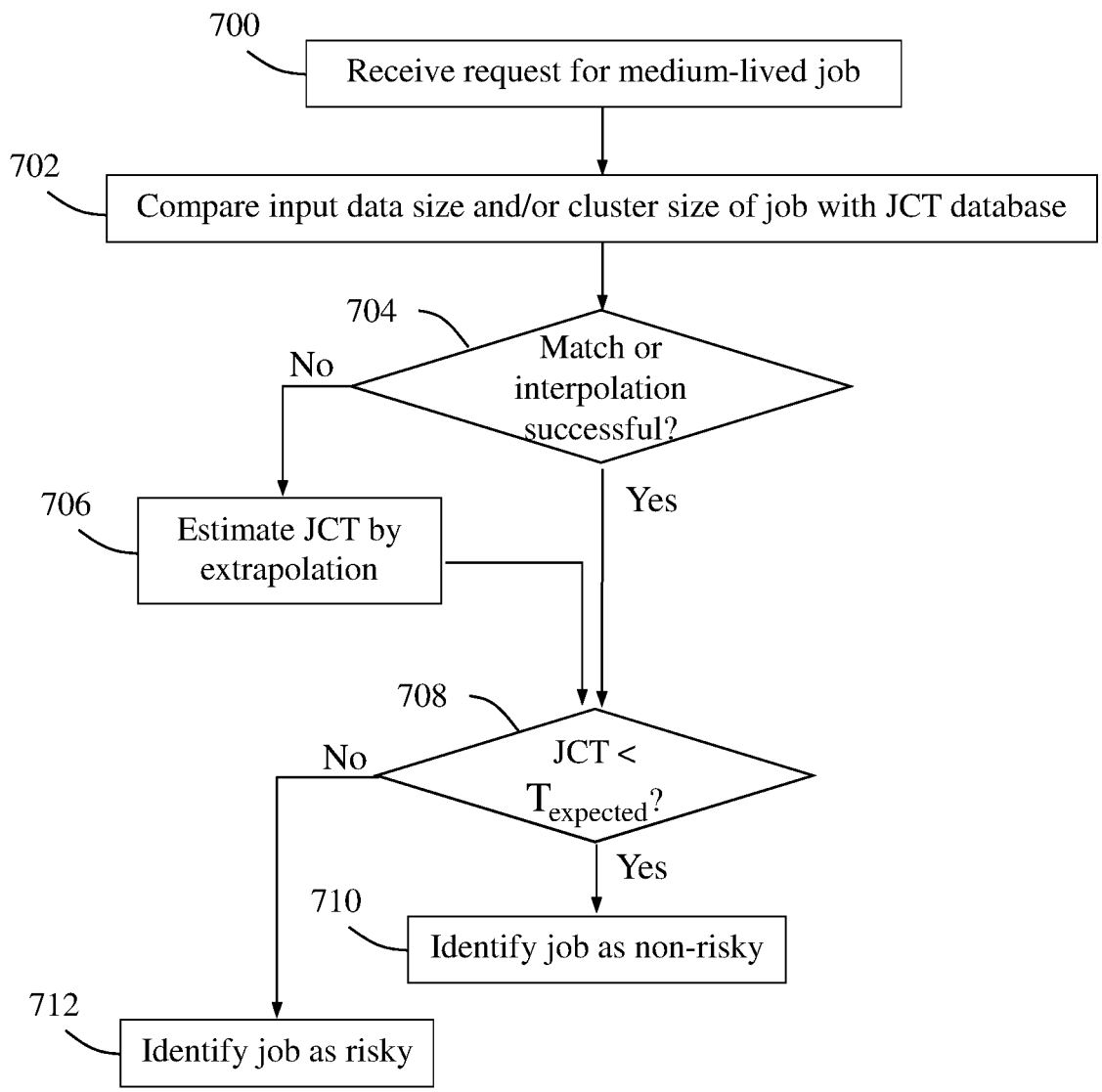
FIG. 7 is a flow chart illustrating an example of how a job scheduling node may determine whether a medium-lived processing job is risky or non-risky, according to further possible embodiments.

A more detailed example of how the actions 608-610 of FIG. 6 may be implemented in practice, will now be described with reference to the flow chart in FIG. 7 comprising actions which may be performed by a job scheduling node. The first action 700 illustrates that the job scheduling node receives a request for a data processing job which is identified as being a medium-lived job, e.g. in accordance with actions 600, 602 and 606 as described above. The job scheduling node will now determine whether the medium-lived job is risky or non-risky by checking a JCT database as follows. It was described above that statistics of how long time it takes to complete different executed data processing jobs, the JCT, may be maintained in the JCT database 206 shown in FIG. 2.

In a next action 702, the job scheduling node compares an input data size of the incoming job, which may also be referred to as "cluster size", with entries in the JCT database which contain different JCTs which have been recorded for different input data sizes or cluster sizes of previously executed jobs. If a match is found in an entry of the JCT database with the same input data size as of the incoming job, the JCT of the incoming job can be estimated from that entry. If no exact match is found but there are two entries in the JCT database which are above and below the input data size of the incoming job, the JCT of the incoming job can be estimated by interpolation between the JCTs of those two entries. Thus, a further action 704 illustrates that the job scheduling node determines whether the above-described match or interpolation in the JCT database is successful or not.

If neither a match nor interpolation in the JCT database is successful, the job scheduling node will estimate the JCT of the incoming job by extrapolation of a JCT recorded for an input data size closest to the input data size of the incoming job, in another action 706. If a match or interpolation in the JCT database was successful in action 704, or after JCT has been estimated by extrapolation in action 706, the job scheduling node proceeds to determine whether the JCT estimated for the incoming job is below a required or expected completion time $T_{expected}$ of the medium-lived data processing job, in an action 708. If so, the medium-lived job can be determined or identified to be a non-risky job in an action 710. This determination corresponds to "No" in the above-described action 610 and the job can be dispatched to a virtual cluster as of action 604. On the other hand, if the JCT of the incoming job is not below $T_{expected}$, the medium-lived job can be determined or identified to be a risky job in an action 712, corresponding to "Yes" in action 610 such that the further scheduling procedure of actions 612-620 may be performed in the manner described above.

Figure 8:
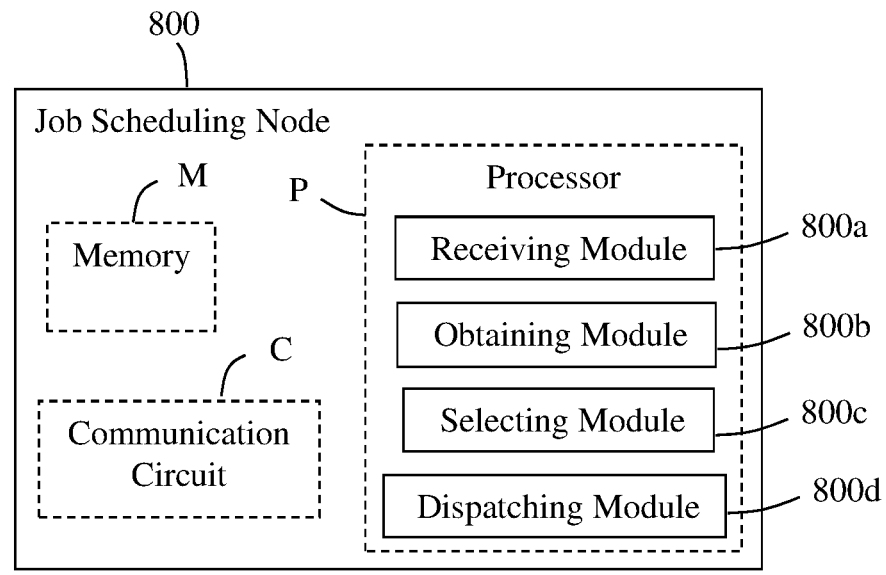
FIG. 8 is a block diagram illustrating a job scheduling node and a resource monitor in more detail, according to further possible embodiments.
Figure 8:
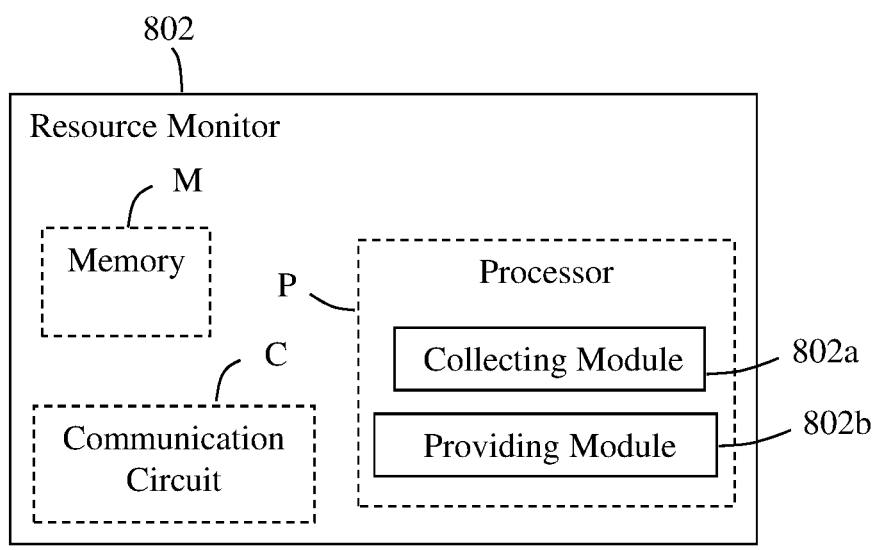

The block diagram in FIG. 8 illustrates a detailed but non-limiting example of how a job scheduling node 800 and a resource monitor 802, respectively, may be structured to bring about the above-described solution and embodiments thereof. In this figure, the job scheduling node 800 and the resource monitor 802 may be configured to operate according to any of the examples and embodiments of employing the solution as described above, where appropriate, and as follows. Each of the job scheduling node 800 and the resource monitor 802 is shown to comprise a processor "P", a memory "M" and a communication circuit "C" with suitable equipment for transmitting and receiving radio signals in the manner described herein.

The communication circuit C in each of the job scheduling node 800 and the resource monitor 802 thus comprises equipment configured for communication with each other over a communication interface using a suitable protocol for data communication depending on the implementation. The solution is however not limited to any specific types of interface or protocol.

The job scheduling node 800 comprises means configured or arranged to perform at least the actions 400-406 of the flow chart in FIG. 4 in the manner described above. Further, the resource monitor 802 comprises means configured or arranged to perform at least the actions 500-502 of the flow chart in FIG. 5 in the manner described above. The actions of FIGS. 4 and 5 may be performed by means of functional modules in the respective processor P in the job scheduling node 800 and the resource monitor 802.

The job scheduling node 800 is arranged to schedule data processing across a range of processing machines. The job scheduling node 800 thus comprises the processor P and the memory M, said memory comprising instructions executable by said processor, whereby the job scheduling node 800 is operative as follows.

The job scheduling node 800 is operative to receive a request for a data processing job. This receiving operation may be performed by a receiving module 800a in the job scheduling node 800, e.g. in the manner described for any of actions 400, 2:2, 600 and 700 above. The job scheduling node 800 is also operative to obtain a current processor resource status of each processing machine, the processor resource status indicating at least current usage of each data processor in said processing machine. This obtaining operation may be performed by an obtaining module 800b in the job scheduling node 800, e.g. in the manner described for any of actions 402, 2:5, and 614 above.

The job scheduling node 800 is further operative to select at least one vacant data processor in the set of processing machines based on the obtained processor resource status, for executing the data processing job. This selecting operation may be performed by a selecting module 800c in the job scheduling node 800, e.g. in the manner described for any of actions 404, 2:6 and 612-618 above.

The job scheduling node 800 is further operative to dispatch the data processing job to at least one processing machine where the at least one selected data processor is located. This dispatching operation may be performed by a dispatching module 800d in the job scheduling node 800, e.g. in the manner described for any of actions 406, 2:7 and 620 above. As said above, a plurality of job scheduling nodes may be employed within the scope of this solution, e.g. distributed in a decentralized manner, to handle any amount of incoming job requests. Each job scheduling node in such an implementation scenario may be configured and operable like the job scheduling node 800 described above.

The resource monitor 802 is arranged to assist a job scheduling node 800 to schedule data processing across a set of processing machines, each processing machine comprising at least one data processor. The resource monitor 802 comprises a processor P and a memory M, said memory comprising instructions executable by said processor whereby the resource monitor 802 is operative as follows.

The resource monitor 802 is operative to collect a current usage of the data processors in each processing machine. This collecting operation may be performed by a collecting module 802a in the resource monitor 802, e.g. in the manner described for any of actions 500 and 2:1 above. The resource monitor 802 is also operative to provide a current processor resource status of each processing machine to the job scheduling node 800, the processor resource status indicating said current usage of each data processor, thereby enabling the job scheduling node 800 to select at least one data processor in the set of processing machines for executing a data processing job, based on the current processor resource status. This providing operation may be performed by a providing module 802b in the resource monitor 802, e.g. in the manner described for any of actions 502 and 2:5 above. Further, the resource monitor 802 may be operative to provide the above processor resource status to multiple job scheduling nodes, if applicable.

It should be noted that FIG. 8 illustrates various functional modules in the job scheduling node 800 and the resource monitor 802, respectively, and the skilled person is able to implement these functional modules in practice using suitable software and hardware. Thus, the solution is generally not limited to the shown structures of the job scheduling node 800 and the resource monitor 802, and the functional modules 800*a-d* and 802*a-b* therein may be configured to operate according to any of the features and embodiments described in this disclosure, where appropriate.

The functional modules 800*a-d* and 802*a-b* described above can be implemented in the job scheduling node 800 and the resource monitor 802, respectively, by means of program modules of a respective computer program comprising code means which, when run by the processor P causes the job scheduling node 800 and the resource monitor 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the job scheduling node 800 and the resource monitor 802 in the form of a memory having a computer readable medium and being connected to the processor P. The computer program product or memory M in each of the job scheduling node 800 and the resource monitor 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective job scheduling node 800 and resource monitor 802.

The solution described herein may be implemented in each of the job scheduling node 800 and the resource monitor 802 by a computer program comprising instructions which, when executed on at least one processor, cause the at least one processor to carry out the actions according to any of the above embodiments, where appropriate. The solution may also be implemented at each of the job scheduling node 800 and the resource monitor 802 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "job scheduling node", "data processing job", "processing machine", "processor resource status", "resource monitor", "scheduling matrix" and "data locality" have been used throughout this disclosure, although any other corresponding entities, functions, and/or parameters could also be used having the features and characteristics described here. The solution is defined by the appended claims.

The invention claimed is:

1. A method performed by a job scheduling node for scheduling data processing across a set of processing machines, each processing machine comprising at least one data processor, the method comprising:
   receiving a request for a data processing job to be performed, wherein the data processing job is composed of a plurality m of tasks, where m is an integer value;
   classifying the data processing job as being any one of short lived, medium lived, or long lived, wherein data processing jobs having durations expected to be within a predefined interval are classified as medium lived;
   responsive to classifying the data processing job as being medium lived, determining whether an estimated job completion time for the data processing job exceeds a required job completion time for the data processing job, the estimated job completion time determined based on recorded statistics for job completion times of previously executed data processing jobs that are similar to the data processing job; and
   responsive to the estimated job completion time exceeding the required job completion time:
      obtaining a current processor resource status of each processing machine in the set of processing machines, the current processor resource status indicating, for each data processor in the processing machine, a current usage of the data processor and an input/output (I/O) time associated with the data processor for retrieving data required for the data processing job; and
      dispatching the m tasks of the data processing job separately to respective ones among m selected vacant data processors, including selecting the m selected vacant data processors by:
         identifying which data processors in the set of processing machines are vacant based on the current processor resource status obtained for each processing machine;
         initially selecting a number of the vacant processors, the number being greater than the m number of tasks in the data processing job, and the initially selected vacant data processors being selected according to an ascending order of the associated I/O times;
         for each of the initially selected vacant data processors, adding a random factor to the value of the I/O time associated with the data processor, to obtain an adjusted value, the random factor being proportional to a communication overhead between the job scheduling node and the data processor; and
         choosing m ones from among the initially selected vacant data processors, as said m selected vacant data processors, according to an ascending order of the adjusted values.

2. The method according to claim 1, wherein the current processor resource status is maintained in a scheduling matrix for each processing machine, the scheduling matrix containing information indicating the current usage of each data processor of each processing machine.

3. A job scheduling node arranged to schedule data processing across a range of processing machines, the job scheduling node comprising a processor and a memory, said memory comprising instructions executable by said processor whereby the job scheduling node is operative to:
   receive a request for a data processing job to be performed, wherein the data processing job is composed of a plurality m of tasks, where m is an integer value;
   classify the data processing job as being any one of short lived, medium lived, or long lived, wherein data processing jobs having durations expected to be within a predefined interval are classified as medium lived;
   responsive to classifying the data processing job as being medium lived, determine whether an estimated job completion time for the data processing job exceeds a required job completion time for the data processing job, the estimated job completion time determined based on recorded statistics for job completion times of previously executed data processing jobs that are similar to the data processing job; and responsive to the estimated job completion time exceeding the required job completion time:

obtain a current processor resource status of each processing machine in the set of processing machines, the current processor resource status indicating, for each data processor in the processing machine, a current usage of the data processor and an input/output (I/O) time associated with the data processor for retrieving data required for the data processing job; and dispatch the m tasks of the data processing job separately to respective ones among m selected vacant data processors, including selecting the m selected vacant data processors, based on the processor being operative to:

identify which data processors in the set of processing machines are vacant based on the current processor resource status obtained for each processing machine;

initially select a number of the vacant processors, the number being greater than the m number of tasks in the data processing job, and the initially selected vacant data processors being selected according to an ascending order of the associated I/O times;

for each of the initially selected vacant data processors, add a random factor to the value of the I/O time associated with the data processor, to obtain an adjusted value, the random factor being proportional to a communication overhead between the job scheduling node and the data processor; and choose the m ones from among the initially selected vacant data processors, as said m selected vacant data processors, according to an ascending order of the adjusted values.

4. The job scheduling node according to claim 3, wherein the current processor resource status is maintained in a scheduling matrix for each processing machine, the scheduling matrix containing information indicating the current usage of each data processor of each processing machine.

* * * * *